United States Patent
Limondin et al.

(10) Patent No.: US 9,020,146 B1
(45) Date of Patent: Apr. 28, 2015

(54) ALGORITHM AGILE PROGRAMMABLE CRYPTOGRAPHIC PROCESSOR

(75) Inventors: Philippe M. Limondin, Cedar Rapids, IA (US); Mark A. Bortz, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1243 days.

(21) Appl. No.: 11/901,528

(22) Filed: Sep. 18, 2007

(51) Int. Cl.
*H04K 1/00* (2006.01)
*H04L 9/06* (2006.01)

(52) U.S. Cl.
CPC .................................. *H04L 9/06* (2013.01)

(58) Field of Classification Search
CPC .......................................................... H04L 9/06
USPC ............................................. 713/189; 380/28
See application file for complete search history.

(56) References Cited

U.S. PATENT DOCUMENTS

| | | | |
|---|---|---|---|
| 5,070,528 A | 12/1991 | Hawe et al. | |
| 5,103,478 A | 4/1992 | Matyas et al. | |
| 5,161,193 A | 11/1992 | Lampson et al. | |
| 5,235,644 A | 8/1993 | Gupta et al. | |
| 5,293,594 A * | 3/1994 | Nojiri et al. | 711/220 |
| 5,473,693 A | 12/1995 | Sprunk | |
| 5,606,616 A | 2/1997 | Sprunk et al. | |
| 5,761,200 A * | 6/1998 | Hsieh | 370/364 |
| 5,784,602 A * | 7/1998 | Glass et al. | 712/220 |
| 6,002,881 A * | 12/1999 | York et al. | 712/34 |
| 6,029,242 A * | 2/2000 | Sidman | 712/42 |
| 6,041,035 A | 3/2000 | Thedens | |
| 6,101,255 A * | 8/2000 | Harrison et al. | 380/52 |
| 7,490,216 B1 * | 2/2009 | Chen et al. | 711/206 |
| 7,506,096 B1 * | 3/2009 | Koryakin et al. | 711/6 |
| 2004/0039928 A1 * | 2/2004 | Elbe et al. | 713/189 |
| 2005/0251542 A1 * | 11/2005 | Hennedy et al. | 708/300 |
| 2006/0155967 A1 * | 7/2006 | Wang et al. | 712/219 |
| 2007/0067481 A1 * | 3/2007 | Sharma et al. | 709/231 |
| 2007/0204166 A1 * | 8/2007 | Tome et al. | 713/182 |
| 2008/0114989 A1 * | 5/2008 | Anbalagan et al. | 713/189 |

OTHER PUBLICATIONS

U.S. Appl. No. 10/616,199, filed Jul. 9, 2003, Jensen et al.

* cited by examiner

*Primary Examiner* — Teshome Hailu
(74) *Attorney, Agent, or Firm* — Angel N. Gerdzhikov; Donna P. Suchy; Daniel M. Barbieri

(57) ABSTRACT

A communication device includes at least one receiver and at least one transmitter. The communication device also includes a cryptographic processor coupled to at least one of the at least one receiver and the at least one transmitter. The communication device further includes the cryptographic processor enabling high speed cryptographic modes. The cryptographic processor includes a resource virtualization subsystem having an address offset register bank and an offset adder coupled to a microaddress calculation logic on a bank virtualization subsystem.

4 Claims, 2 Drawing Sheets

ALGORITHM AGILE PROGRAMMABLE CRYPTOGRAPHIC PROCESSOR

BACKGROUND

Military and commercial computing, communication and navigation products often require high speed encryption and decryption of data. Commonly assigned, non-provisional U.S. patent application Ser. No. 10/616,199, filed Jul. 9, 2003, entitled "Method And System For Cryptographic Processing" and listing as inventors D. Jensen, M. Bortz, and T. MacDonald describes the Programmable Cryptography Processor (PCP) architecture developed by Rockwell Collins to address the security needs of several military products. The PCP provides a fully configurable, non-classified encryption core that supports a variety of legacy and modern algorithms.

Future systems using modern algorithms may have agility and throughput requirements greater than the current capabilities of the PCP design. In addition, continuing advances in algorithmic complexity and security levy strong requirements on the development of next-generation encryption hardware development.

The PCPr0 available from Rockwell Collins of Cedar Rapids, Iowa is an exemplary high performance, general-purpose, cryptographic processor developed from the concepts outlined in the referenced PCP U.S. patent application Ser. No. 10/616,199. The microarchitecture of the PCP processing core provides an engine that can perform many different modern and legacy cryptographic algorithms: AES, Medley, Keesee, Shillelagh, Saville, etc. The microcode loaded into the device control store memory defines which algorithms are currently supported.

In exchange for the configurability and flexibility to support many different algorithms, the architecture is limited in its number of configuration blocks. The conventional PCP architecture is designed to support one algorithm at a time, meaning a configuration loaded into the device contains all information needed to execute only that single algorithm. Accordingly, there is a need to modify the current PCP architecture to provide algorithm agility, which is the support for multiple concurrent algorithms using a single configuration load. In addition, there is a need for the ability to take existing single algorithm implementations and combine them into a concurrent algorithm implementation without requiring a recompile of the algorithm code. Finally, there is a need for supporting the functionality to switch algorithms on word boundaries.

The techniques herein below extend to those embodiments which fall within the scope of the appended claims, regardless of whether they accomplish one or more of the above-mentioned needs.

SUMMARY

In one aspect, a communication device includes at least one receiver and at least one transmitter. The communication device also includes a cryptographic processor coupled to at least one receiver and to at least one transmitter. The communication device further includes the cryptographic processor enabling high speed cryptographic modes. The cryptographic processor includes a resource virtualization subsystem having an address offset register bank and an offset adder coupled to microaddress calculation logic on a bank virtualization subsystem.

In another aspect, a communication device includes at least one receiver and at least one transmitter. The communication device further includes a cryptographic processor coupled to at least one of the at least one receiver or at least one transmitter. The cryptographic processor enables high speed cryptographic modes. The cryptographic processor includes a resource virtualization subsystem having an address offset register bank and an offset adder coupled to microaddress calculation logic of a bank virtualization subsystem.

In yet another aspect, a method of modifying a programmable cryptographic processor (PCP) includes instantiating a resource virtualization subsystem on the PCP. The method also includes instantiating a block virtualization subsystem on the PCP.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
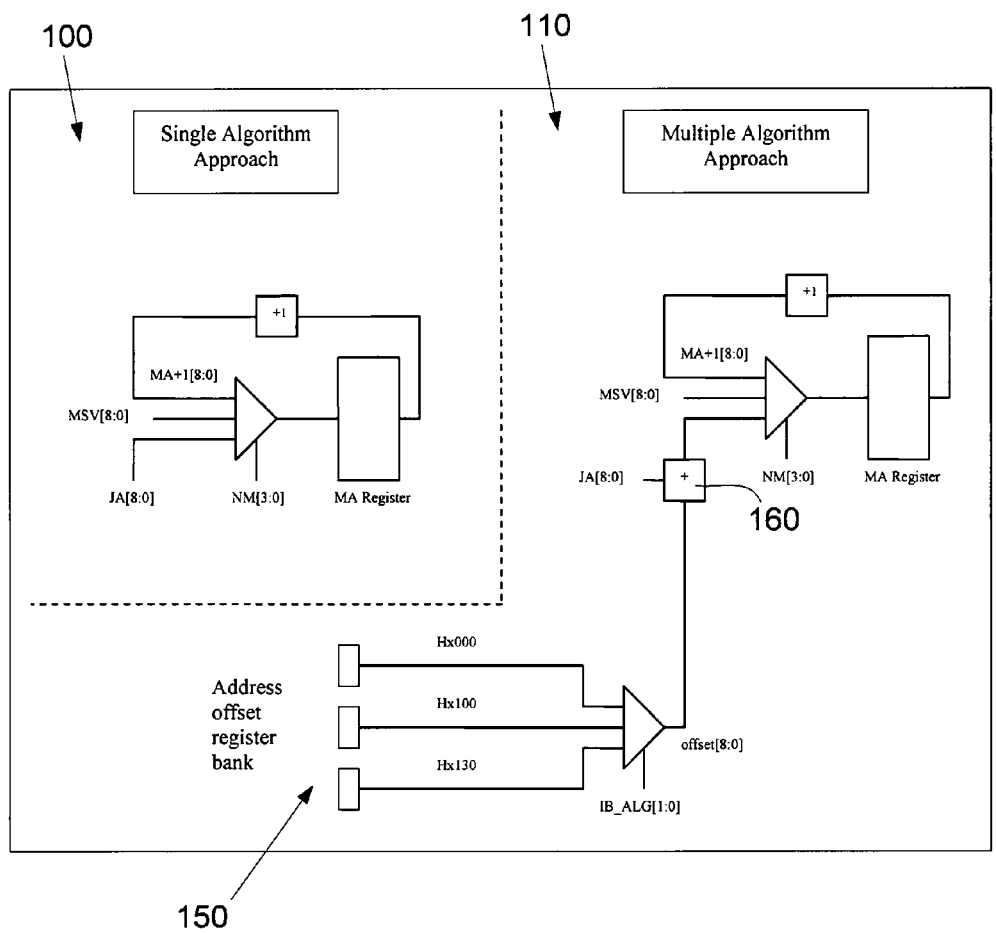
FIG. 1 is an exemplary block diagram of a microaddress virtualization configuration.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

The design approach for supporting algorithm agility may encompass two major efforts: additional resource allocation, and resource virtualization.

A conventional PCP may contain limited configuration and RAM resources. By increasing the number of register configurations or RAM blocks, the architecture may be able to support more than one algorithm concurrently.

Resource virtualization is the process by which the individual resources of a single algorithm (as depicted in diagram 100) are mapped to a multiple algorithm design (as depicted in diagram 110). The microsequencer is responsible for controlling the flow of data through the PCP. Addressing in the microcode is often relative to the current microaddress (MA) being executed. To support multiple algorithms without recompile, an address offset register bank 150 of algorithm offsets corresponding to the number of algorithms supported would be loaded during configuration. An offset adder 160 would be added to the relative jump address (JA) path in the next microaddress calculation logic. A register bank of offsets and an offset adder is also needed in the RAM address generation logic. The result of the offset register and adder logic is the calculation of a virtual microaddress as shown in FIG. 1.

Figure 2:
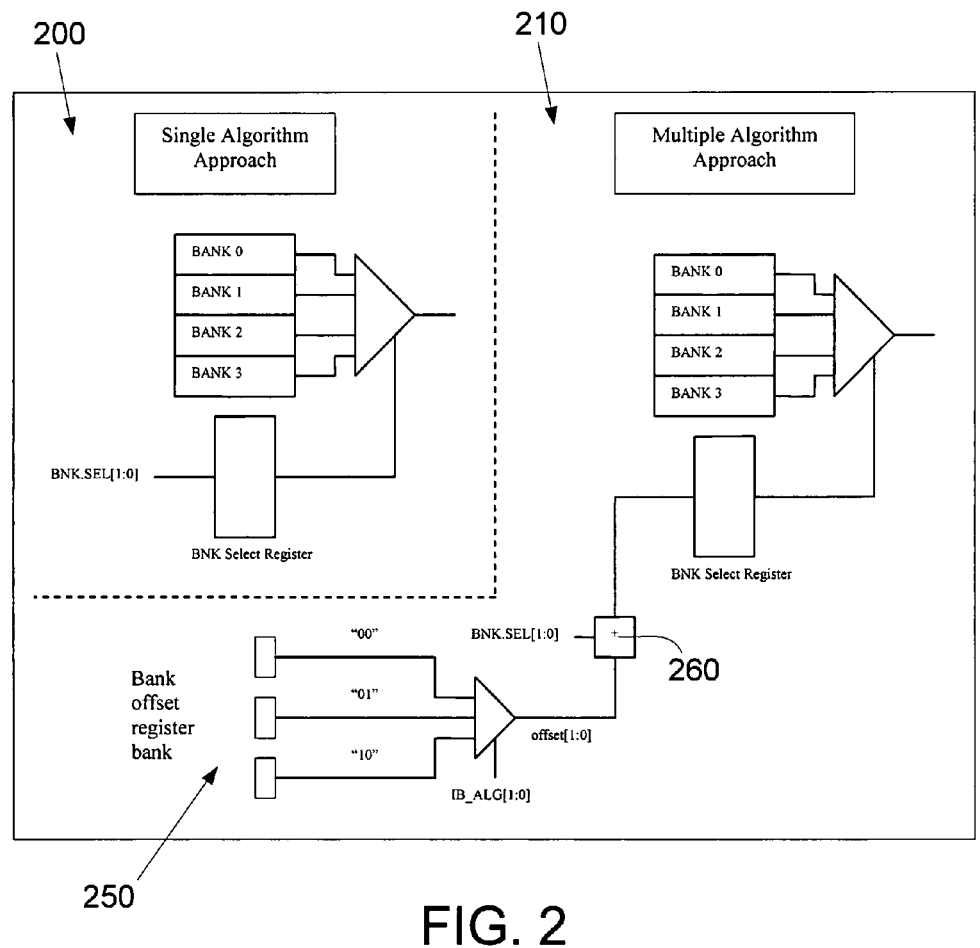
FIG. 2 is an exemplary block diagram of a block virtualization configuration.

In order for individual pipeline stages to support multiple algorithms without recompile, an offset needs to be provided to virtualize the bank selection in the various pipe stages. A multiple algorithm approach depicted in diagram 210 may be compared with the conventional single algorithm approach depicted in diagram 200 of FIG. 2. A bank offset register bank 250 corresponding to the number of algorithms supported would be loaded during configuration. Upon selection of a particular algorithm, the appropriate offset will be selected and added at adder 260 to the current bank select field. The resulting bank value will be the virtual bank select for a given pipe stage and the current algorithm, as shown in FIG. 2.

Exemplary architecture modifications to support algorithm agility are described below. These modifications refer to an exemplary PCPr0 instantiation of the referenced PCP architecture outlined in U.S. patent application Ser. No. 10/616,199 which is herein incorporated by reference in its entirety and which provides exemplary support for the implementations claimed and described. Further, similar architecture modifications may be made to alternate cryptographic processing core implementations without departing from the scope of the claims.

The PCPr0 instantiation makes use of several register or RAM based configuration blocks including logic permutation units and look-up tables. To fully support algorithm agility and allow the targeting of multiple algorithms without the need to recompile, an offset needs to be provided which virtualizes bank selection. An offset register bank corresponding to the number of algorithms supported may be loaded at configuration time. Upon selection of a particular algorithm, the appropriate offset will be added to the register or RAM based configuration. The resulting bank value will be the virtual bank select for the active algorithm. The application of these techniques to the register and RAM based configuration blocks in the exemplary PCPr0 instantiation describes the process of bank virtualization in a cryptographic processing core, and are applicable to state based cryptographic resources.

Additionally, the PCPr0 instantiation is a microcoded device by which the algorithmic firmware is loaded into an internal control store memory. The handling of algorithm agility on data word boundaries must be targeted to this portion of the processing core design. An automated method of handling algorithm agility must be devised, in which the best candidate is to implement the generic virtualization methods described previously to calculate new start addresses when an algorithm switch case has been detected. Multiplexing the microaddress calculation path serves to allow word boundary switching of algorithms. These techniques can be generally applied to all microcoded cryptographic devices which support sufficient memory to store several concurrent algorithm instantiations.

Finally, the addition of algorithm agility enhancements to a given cryptographic processing core must be handled in a safe manner. This requires a method to indicate to the system when a safe algorithm switch may occur. This functionality is handled by expanding the capabilities of the microcode control store with additional fields to signal the underlying hardware when to begin processing the next data word with a new algorithm. This is similar in fashion to the methods used to handle key agility in the reference PCPr0 instantiation.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A communication device, comprising:
   at least one of a receiver or a transmitter; and
   a cryptographic processor coupled to at least one of a receiver or a transmitter, the cryptographic processor including:
   microaddress calculation logic;
   a jump address path providing a jump address to the microaddress calculation logic;
   an address offset register bank including a number of registers corresponding to a number of supported algorithms;
   address offset selection logic configured to select an address offset from the address offset register bank;
   an offset adder coupled to the microaddress calculation logic and configured to add a selected address offset to the jump address of the jump address path;
   bank select logic;
   a bank offset register bank including a number of registers corresponding to the number of supported algorithms;
   bank offset selection logic configured to select a bank offset from the bank offset register bank;
   a bank select path providing a bank select signal to the bank select logic; and
   an adder configured to add a selected bank offset to the bank select signal path.

2. The communication device of claim 1, wherein the cryptographic processor is configured to support multiple waveforms.

3. The communication device of claim 1, wherein the communication device includes a military radio.

4. A method, comprising:
   loading one or more address offsets to a first register bank of a programmable cryptographic processor (PCP), the first register bank including a number of registers corresponding to a number of supported algorithms;
   adding an offset of the first register bank to a jump address path provided as an input to microaddress calculation logic of the PCP;
   calculating a virtual microaddress;
   loading one or more offsets to a second register bank of the PCP, the second register bank including a number of registers corresponding to the number of supported algorithms;

adding an offset of the second register bank to a bank select address path provided as an input to a bank select logic of the PCP.

* * * * *